US009028322B2

(12) United States Patent
Lang et al.

(10) Patent No.: US 9,028,322 B2
(45) Date of Patent: May 12, 2015

(54) METHOD AND SYSTEM FOR PROVIDING GAMBLING GAMES

(76) Inventors: Ashley Lang, Gibralter (GI); Dennis Diaconescu, Gibralter (GI); Peter Mares, Gibralter (GI)

( * ) Notice: Subject to any disclaimer, the term of this patent is extended or adjusted under 35 U.S.C. 154(b) by 0 days.

(21) Appl. No.: 13/585,608

(22) Filed: Aug. 14, 2012

(65) Prior Publication Data

US 2014/0051497 A1 Feb. 20, 2014

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ........ *G07F 17/3241* (2013.01); *G07F 17/3227* (2013.01)

(58) Field of Classification Search
USPC .......................................... 463/29, 42, 25–28
See application file for complete search history.

(56) References Cited

U.S. PATENT DOCUMENTS 6,755,741 B1 * 6/2004 Rafaeli ........................... 463/25
7,831,439 B1 * 11/2010 Bryar et al. .................... 705/1.1
2003/0078103 A1 4/2003 LeMay et al.
2007/0167226 A1 * 7/2007 Kelly et al. ..................... 463/29
2012/0202587 A1 * 8/2012 Allen et al. ..................... 463/25

FOREIGN PATENT DOCUMENTS

EP 1 916 022 A2 4/2008
WO WO 03/007254 A2 1/2003
WO WO 2009/005619 A1 1/2009
WO WO 2010/096784 A1 8/2010

OTHER PUBLICATIONS

Search Report and Examination Opinion for GB Application No. 1214511.6, mailed Dec. 13, 2012.
International Search Report and Written Opinion for International Application No. PCT/GB2013/052155, mailed Nov. 18, 2013.

* cited by examiner

*Primary Examiner* — Kevin Y Kim
(74) *Attorney, Agent, or Firm* — Cooley LLP

(57) ABSTRACT

Methods and systems for providing gambling games to users wherein the games are not tied to a particular gaming operator. Specifically, a third party gaming system provides central access to a library of gambling games offered by multiple gaming operators. Players connect to the third party gaming system and select a game from the library of gambling games. Once a player has selected a game, the third party gaming system provides the player with a game client for the selected game and operator configuration parameters for a suitable gaming operator system. The game client then dynamically reconfigures itself using the configuration parameters to connect to the gaming operator system to play the game. In some cases after the user has selected a game they are provided with a list of gaming operators that offer the selected game and the player can select which operator that they wish to play with.

18 Claims, 10 Drawing Sheets

500

| | Automatically Detected | Manually Entered | Account Information | Description |
|---|---|---|---|---|
| 502 | A | A | A | All Match |
| 504 | A | A | B | Single Mismatch |
| 506 | A | B | A | Single Mismatch |
| 508 | B | A | A | Single Mismatch |
| 510 | A | B | C | Complete Mismatch |

FIG. 5

METHOD AND SYSTEM FOR PROVIDING GAMBLING GAMES

BACKGROUND

Traditionally if a user wanted to play an online gambling game, the user had to first connect to a licensed online gaming company's website and then select one of the games offered by that company. This restricts the number of games that are available to a user and makes it difficult for developers to market their games directly to suitable players (e.g. players based in a certain jurisdiction).

The embodiments described below are not limited to implementations which solve any or all of the disadvantages of known gambling systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are methods and systems for providing gambling games to users wherein the games are not tied to a particular gaming operator. Specifically, in the methods and systems described herein a third party gaming system provides central access to a library of gambling games offered by a plurality of gaming operators. Players connect to the third party gaming system and select a game from the library of gambling games. Once a player has selected a game, the third party gaming system provides the player with a game client for the selected game and operator configuration parameters for a suitable gaming operator system. The game client then dynamically reconfigures itself using the configuration parameters to connect to the gaming operator system to play the game. In some cases after the user has selected a game they are provided with a list of gaming operators that offer the selected game and the player can select which operator that they wish to play with.

In a first aspect there is provided a system to provide a plurality of gambling games to a player, the system comprising: a plurality of operator systems, each operator system configured to facilitate play of at least one of the gambling games; and a third party gaming system remotely located from the plurality of operator systems, the third party gaming system configured to: receive a request from an end-user device associated with the player to play a selected gambling game of the plurality of gambling games; obtain a game client for the selected gambling game, the game client enabling the player to play the selected game; provide the game client to the end-user device; generate operator configuration parameters for the game client, the operator configuration parameters comprising connection information for a selected operator system of the plurality of operator systems; and provide the operator configuration parameters to the end-user device to enable the game client to be dynamically configured to communicate with the selected operator system.

In a second aspect there is a provided a computer-implemented method to provide a plurality of gambling games to a player, the method comprising: receiving, at a third party gaming system, a request from an end-user device associated with the player to play a selected game of the plurality of games; obtaining, at the third party gaming system, a game client for the selected game, the game client enabling the player to play the selected game; providing the game client to the end-user device; generating, at the third party gaming system, operator configuration parameters, the operator configuration parameters comprising connection information for a selected gaming operator of the plurality of gaming operators; and providing the operator configuration parameters to the end-user device so that the game client can be dynamically configured to communicate with the selected gaming operator.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIG. 5 is a schematic of a method for determining the players jurisdiction;

Figure 1:
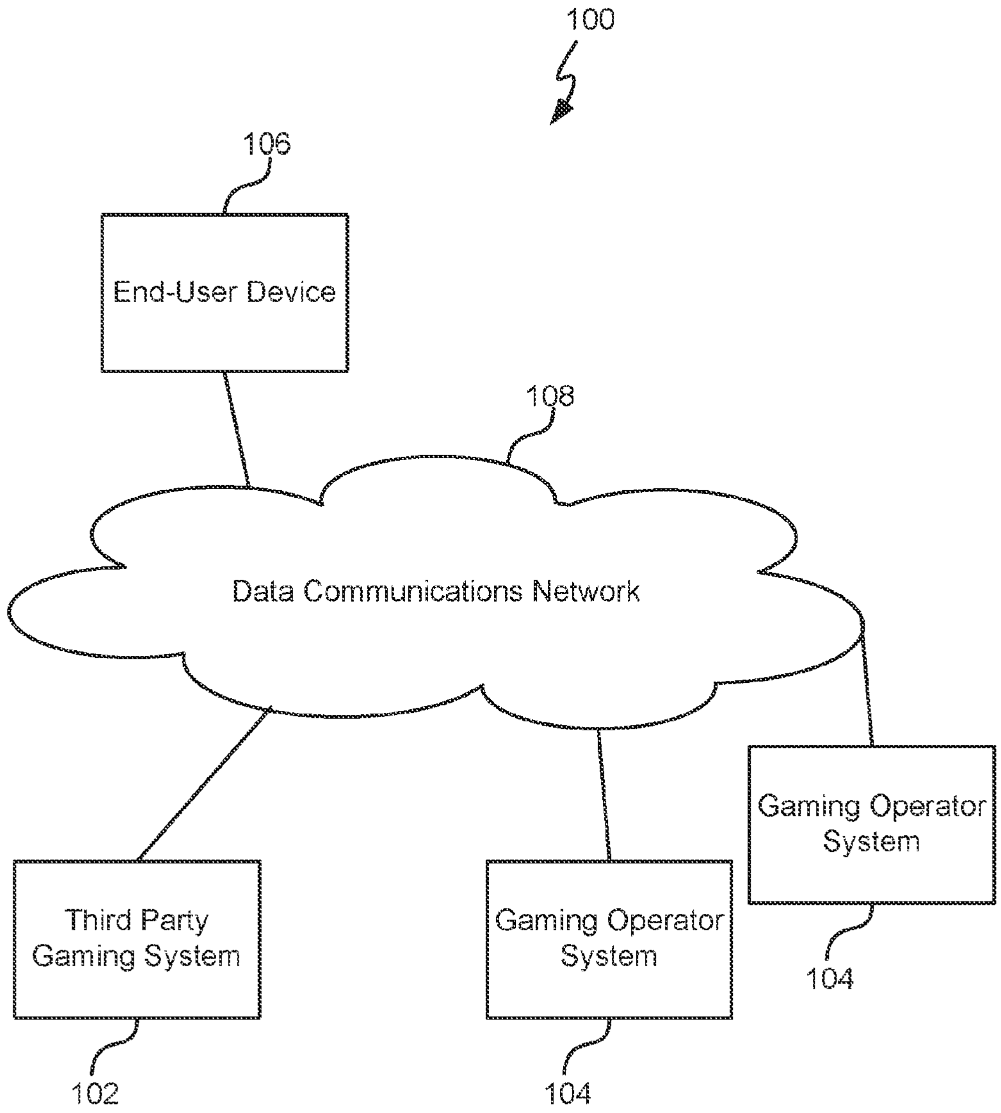
FIG. 1 is a block diagram of system for providing a plurality of gambling games to players.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Described herein are methods and systems for providing gambling games to users wherein the games are not tied to a particular gaming operator. Specifically, in the methods and systems described herein a third party gaming system provides central access to a library of gambling games offered by a plurality of gaming operators. Players connect to the third party gaming system and select a game from the library of gambling games. Once a player has selected a game, the third party gaming system provides the player with a game client for the selected game and operator configuration parameters for a suitable gaming operator system. The game client then dynamically reconfigures itself using the operator configuration parameters to connect to the gaming operator system to play the game. In some cases after the user has selected a game they are provided with a list of gaming operators that offer the selected game and the player can select which operator that they wish to play with.

The methods and systems described herein may also allow the game client to be dynamically configured based on player attributes. Player attributes may include, but are not limited to, one or more of: the players jurisdiction, currency, language and/or mode of play. The player attribute data may be obtained via any suitable means. For example, the player attribute data may be manually provided by the user, automatically determined, obtained from another source (e.g. a player gambling account or a social media account (e.g. Facebook)), or obtained using a combination of any of these methods.

Traditional game clients are configured pre-run time for a specific mode of play and/or a specific operator. Furthermore most game clients are packaged with localized string sets for all the languages, jurisdictions and currencies supported.

By allowing game clients to be dynamically configured based on the operator and/or player attributes only a single game client needs to be stored for each game thus reducing the storage requirements. Furthermore, by only sending the string set matching the players attributes to the player (instead of the string sets for all of the languages, jurisdictions and currencies supported) the amount of data sent to the player may be reduced. Finally, since the game client is dynamically reconfigured on the fly, operators and system administrators can easily implement changes to games transparently. Specifically, changes can be implemented without having to regenerate new game clients.

The term "gaming operator" is used herein to mean an online or offline gaming company or entity that acts as a host of the wagering activity of a supported gambling game.

The term "gambling game" is used herein to mean any game that allows a player to wager on one or more aspects of the game. The wager may be made using real money, virtual currency, tokens or any other suitable medium of exchange or reward. Gambling games include, but are not limited to, traditional gambling games (e.g. Blackjack, Roulette, Poker and Bingo), lottery games, and any other house game or peer-to-peer game or variants thereof. Gambling games also include games that in addition to offering wagering also offer non-wager related purchases. For example, some gambling games may allow players to purchase advancements in the game and/or items that simply alter the display of one or more aspects of the game. For example, some gambling games may allow the player to purchase skins or other items that alter the presentation of the game, whereas other gambling games may allow the player to purchase level advancements or items (e.g. a shield or a wall) to increase the player's chances of winning.

Each gambling game is associated with a particular game archetype and one or more sub-archetypes. A game archetype defines the high-level rules and available features for the game. Examples of game archetypes include, but are not limited to, 3-hand Blackjack, 1-hand Blackjack, and Roulette. A sub-archetype represents a specific certified configuration of a particular game archetype. For example, the 3-hand Blackjack archetype may have a plurality of sub-archetypes, each with a different return to player (RTP). For example, one sub-archetype may offer 90% RTP, one sub-archetype may offer 92% RTP and another sub-archetype may offer 95% RTP. Similarly a 1-hand Blackjack archetype may have a plurality of its own sub-archetypes, each with a different RTP.

The term "jurisdiction" is used herein to mean a specific geographic area and may include, but is not limited to, a continent, a country, a group of countries, a union (e.g. the European Union), a city/town, a post code/zip code, province/state, a region, a sub-region, or any other physical or virtual territory.

Reference is made to FIG. 1 which illustrates a system 100 for providing gambling games to players in accordance with an embodiment. The system 100 comprises a third party gaming system 102 that provides central access to a plurality of gambling games, a plurality of gaming operator systems 104 that offer play of one or more of the gambling games in one or more jurisdictions, an end-user device 106 that allows a player to play one or more of the gambling games via one or more operator systems 104, and a data communications network 108 that enables communication between the third party gaming system 102, the gaming operator systems 104 and the end-user device 106.

The third party gaming system 102 is a computer-based system that provides central access and management of a plurality of gambling games. Specifically, the gaming system 102 maintains a library of gambling games developed by one or more game developers. Gaming operators access the library of gambling games to find and license games for their customers. Players can browse the library of gambling games to select games to play. Once a player has selected a game to play, the gaming system 102 provides the player with a game client for the selected game and operator configuration parameters for an appropriate operator system 104. The game client then uses the operator configuration parameters to dynamically reconfigure itself to communicate with the operator system 104 to play the game.

In some cases, the gaming system 102 provides the player with a list of operators that offer the selected game. In other cases an appropriate operator is automatically selected for the player. For example, in some cases the player via the end-user device 106 may first access a specific gaming operator's website where they are subsequently directed to the third party gaming system 102. In these cases, the player may be restricted to the specific gaming operator's system 104.

In some cases the gaming system 102 also provides the player with player configuration parameters that allow the game client to dynamically reconfigure itself for certain player attributes including, but not limited to, the player's jurisdiction, currency and/or language.

Each gaming operator system 104 is a computer-based system that facilitates play of gambling games in one or more jurisdictions. Each gaming operator system 104 is operated by a gaming operator. A single gaming operator may operate a plurality of gaming operator systems 104. For example, a single gaming operator may operate one gaming operator system 104 that serves customers in Italy and one gaming operator system 104 that serves customers in all other jurisdictions. Although the system 100 of FIG. 1 shows two gaming operator systems 104 it will be evident to a person of skill in the art that the system may support more than two gaming operator systems.

In traditional gaming systems each gaming operator operates their own website or the like where they offer a predefined list of gambling games to their customers. Players then connect to a particular gaming operator website and select one of the games provided. In contrast, in the system 100 of FIG. 1, it is the third party gaming system 102 that provides access to the games and the player is connected to an appropriate operator system 104 (e.g. one that operates in the user's jurisdiction) after they have selected a game.

The end-user device 106 is a computing device that allows an associated player to play a gambling game. The end-user device 106 may be, but is not limited to, a personal computer, a laptop computer, a tablet computer, a mobile phone, a smart phone, a kiosk, a thin-client, a personal game system (e.g. Sony's PlayStation 3 or Microsoft's Xbox), a device that projects the game to the player, an interactive surface (e.g. Microsoft Surface), or any other device capable of allowing players to play a gambling game. Although the system 100 of FIG. 1 shows a single end-user device 106 it will be evident to a person of skill in the art that the system may support multiple end-user devices associated with various players.

The data communication network 108 may be any type of data network, or combination of data networks, capable of enabling data communications between the third party gaming system 102, the gaming operator systems 104, and the end-user device 106. For example, the communications network 108 may be a public switched telephone network (PSTN), a mobile telephone network, a wired data network, a wireless data network, or any combination thereof.

Figure 2:
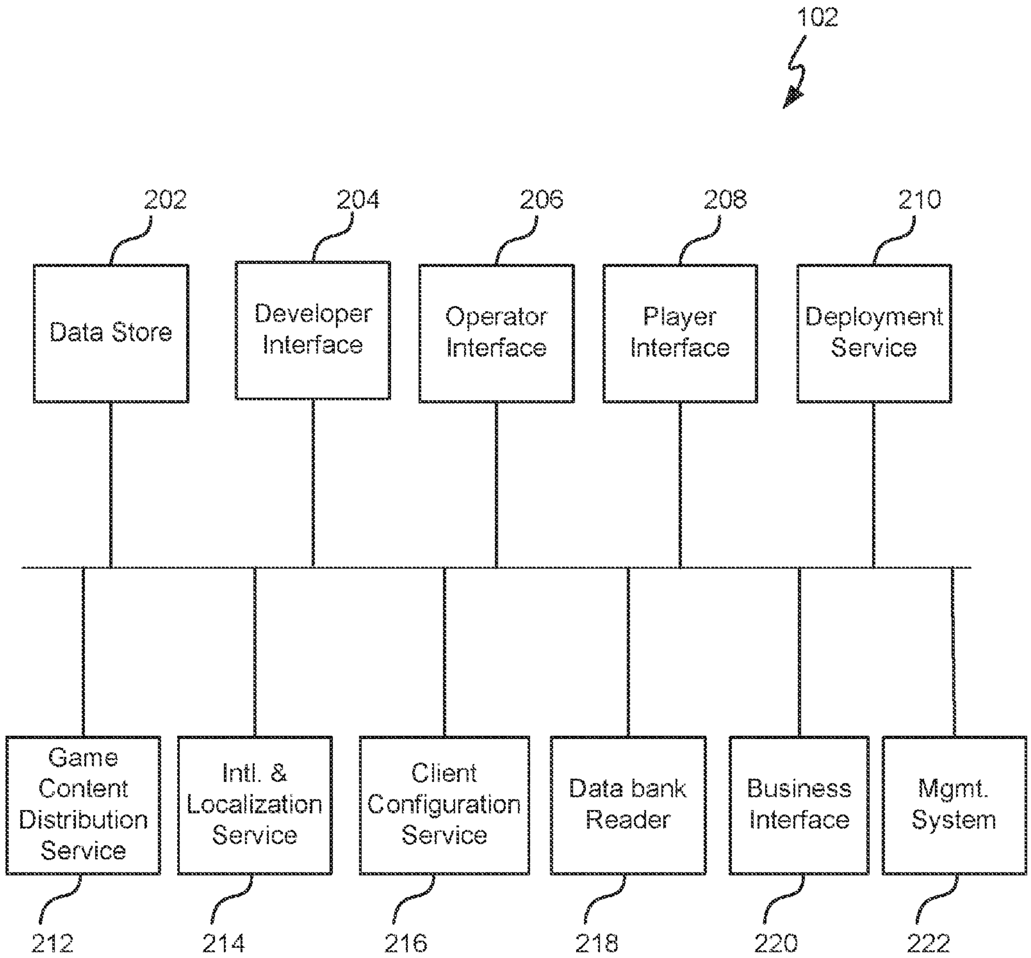
FIG. 2 is a block diagram of an exemplary third party gaming system of FIG. 1.

Reference is now made to FIG. 2, which illustrates a block diagram of an exemplary third party gaming system 102 of FIG. 1. The third party gaming system 102 of FIG. 2 comprises a data store 202 for storing data used by the gaming system 102; a developer interface 204 for allowing game developers to upload games to the gaming system 102; an operator interface 206 for allowing gaming operators to find and license new gambling games; a player interface 208 for allowing a player to browse the gambling games offered by the gaming system 102; a deployment service 210 for deploying games and other updates to the operator systems 104; a game content distribution service 212 for providing game clients to players; an internationalization and localization service 214 for providing localized configuration data for the game client; a client configuration service 216 for generating operator-specific configuration data for the game client; and a data bank reader 218 for obtaining transaction data from the operator systems 104.

The data store 202 is configured to store data used by the gaming system 102. For example, the data store 202 may be configured to store game data, operator data and developer data. Game data may include, but is not limited to, data definitions of games, game rules and game configuration. In some cases the game content itself is also stored in the data store. In other cases the game content is stored by the game content distribution service 212. Operator data refers to any operator specific information and may include, but is not limited to, gaming operator authentication information, gaming operator profiles and gaming operator financial information. Developer data refers to any developer-specific information and may include, but is not limited to game developer authentication information, a game developer profile and game developer financial information.

The data store 202 may also be configured to store player data. For example, in some cases the gaming system 102 may be configured to generate and store player accounts. Each player account may include, but is not limited to, one or more of the players name, billing address (including country of residence), authentication or log-in information (e.g. username and password) for the third party gaming system 102, game preferences (i.e. preferred currency, language), and other personal data. In some cases the player account may also include authentication or log-in information for one or more operators.

The data store 202 may also be configured to store environmental configuration data. Environmental configuration data is data describing the structure of a computing environment including, but not limited to, IP addresses, port(s), operating system and applications (including version number) used and/or installed on each device in the environment.

The data store 202 may be in the form of a single database, a plurality of databases or any other suitable form that allows storing and accessing data.

The developer interface 204 is configured to allow game developers to manage their portfolio of games on the gaming system 102. Specifically, the developer interface 204 allows game developers to load new games onto the gaming system 102. The term "game developer" is used herein to mean an entity (i.e. company or individual) that develops gambling games to be licensed to gaming operators.

In some cases, the developer interface 204 is configured to allow a game developer to load game content representing a test instance of a new game on the gaming system 102. The test instance is then submitted for approval. In some cases the approval is divided into two phases: technical approval and product approval. The technical approval may be designed to check that the game works (this may done, for example, via user acceptance testing), satisfies the third party gaming system's game policies (this may be done, for example, via correctness checks), doesn't do anything malicious (this may be done, for example, via security checks), and complies with regulations (this may be done, for example, via compliance checks).

The product approval may be designed to ensure that the game satisfies the third party gaming system's game policies from a game perspective, is appropriate with the third party gaming system's policies and spirit, correctly displays and uses language tokens; and has undergone enough content editing and preparation to be send off to the translators.

Once the test instance has been approved, the game content is processed to prepare it for production and stored by the game content distribution service 212. Processing the game content may, for example, comprise removing unnecessary components, optimization (e.g. stripping out white space) and/or obfuscation (e.g. obscuring the game content so the code can't be read). For example, the game content distribution service may be configured to remove components, such an HTML library, which were submitted as part of the test instance, but are no longer used in a production environment. Once the game content is stored by the game content distribution service 212 it becomes available for licensing by an operator.

If the test instance is not approved the game is rejected. The game developer is notified along with reasons for the rejection. The game developer then has the option of modifying the game to address the reasons for the rejection. Once the game has been modified, the game may be resubmitted for approval.

The developer interface 204 may also be configured to allow developers to place restrictions on all or some of their games. For example, in some cases the developer interface 204 may be configured to allow game developers to restrict all or some of their games to specific target markets by configuring jurisdictional and/or currency restrictions. However, it will be evident to a person of skill in the art that the developer interface 204 may allow the developer use other criteria and/or attributes to place restrictions on their games. Restrictions placed on all the games of a particular game developer are referred to as global restrictions. Restrictions placed on only a particular game or games will be referred to as local restrictions.

The developer interface 204 may also be configured to allow game developers to manage and access their financial and operational reports, request payment, manage their accounts, and access resource and reference reading materials relevant to the gaming system 102. Accordingly, the developer interface 204 may be in communication with the data store 102 to access and update the game developer data.

In some cases the developer interface 204 may require the game developer to authenticate themselves using, for example, a username and password, before they are granted access to the developer interface 204. In some cases, such as when a game developer is a company, there may be more than one user associated with a game developer. In these cases each user may be given their own account which may have different access rights associated therewith. For example, some users may have restricted access (e.g. they may be able to load game content and access reference material, but will be not able access to financial information), whereas other users may have full access.

In some cases the developer interface 204 may be in the form of a web portal. In other cases, the developer interface 204 may be in the form of a smart phone application (e.g. a native Apple iOS application). However, it will be evident to a person of skill in the art that the developer interface 204 may take any suitable form.

The operator interface 206 is configured to allow gaming operators to find, license and deploy new games. Specifically, the operator interface 206 allows gaming operators to access the library of game content stored by the game content distribution service 212 and select gambling games that they wish to offer to their customers. In some cases, operators will be able to browse all of the games in the library. In other cases, the list of games shown to a particular operator may be filtered based on one or more criteria. For example, in some cases the list of games shown to a particular operator may be filtered based on jurisdiction, currency and/or developer restrictions.

Once a gaming operator has selected a particular game to license they can configure a game instance of the selected game. A game instance links particular game content with a set of operator defined configuration parameters. The configuration parameters are used to specify the specific game archetype and sub-archetype which is used to provide the appropriate game logic for the game.

The configuration parameters may also be used to specify the risk profile for that game. For example, the configuration parameters may include, but are not limited to, overall minimums, overall maximums, position minimums, position maximums, bet resolution, bet increments, chip sizes, and denomination sizes. In some cases the operator interface 206 may comprise intelligent heuristics to aid the operator in assessing the risk.

The configuration parameters may also be used to restrict access to the game. For example, the configuration parameters may include jurisdiction and/or currency restrictions.

Each game instance may be assigned a unique ID. The unique ID may be in the form of a UUID (Universally Unique Identifiers) that follows the canonical representation XXXXXXXX-XXXX-XXXX-XXXX-XXXXXXXXXXXX (8-4-4-4-12 form), however, it will be evident to a person of skill in the art that other suitable forms may also be used for the unique ID.

Once the game instance is created the game instance is deployed to the gaming operators system 104. The deployment may be managed by one or more deployment services 210. Deployment services will be described in greater detail below. In some cases the game content itself is not sent to the operator systems 104, thus deployment of a game instance comprises transferring only the game configuration parameters to the appropriate operator system 104.

In some cases the operator interface 206 may be configured to allow a gaming operator to create multiple instances of a game. For example, in some cases the operator interface 206 may allow a gaming operator to create up to three game instances of any particular game. In some cases the limit on the number of instances of a game may be fixed. In other cases the limit on number of instances of a game may be configurable.

The operator interface 206 may also be configured to allow gaming operators to access financial and operational reporting, manage their accounts, and access resources and technical references relevant to the gaming system 102. Accordingly, the operator interface 206 may be in communication with the data store 202 to access and update the operator data.

In some cases the operator interface 206 may require the gaming operator to authenticate themselves using, for example, a username and password, before they are granted access to the operator interface 206. In some cases there may be more than one user associated with the operator. In these cases each user may be given their own account which may have different access rights associated therewith. For example, some users may have restricted access (e.g. they are able to browse and select games, but they are not allowed to access the financial information) whereas other users may have full access.

In some cases the operator interface 206 may be in the form of a web portal, however, it will be evident to a person of skill in the art that the operator interface 206 may take any suitable form.

The player interface 208 allows players to browse and select games from the library of gambling games. In some cases the player may only be allowed to browse and select games that have been licensed by at least one operator. In others cases the player may be allowed browse and select any game regardless of whether it has been licensed by an operator.

In other cases the list of games available or shown to a player may be filtered using one or more other criteria in addition to or instead of filtering based on whether the game has been licensed. For example, in some cases the player may only be shown games that are available in the player's jurisdiction. In other cases the player may only be shown games provided by a single operator.

Once a player has selected a game the player interface 208 sends a request for the selected game along with player attributes to the game content distribution service 212. The game content distribution service 212 then sends the player (via the end-user device 106) a game client (comprising the appropriate game content). The game content distribution service 212 will be described in more detail below. Once the player has received the game client, the player uses the game client to communicate with the gaming system 102 and the operator system(s) 104. If a player selects a game that has not been licensed by an operator or is not available in the player's jurisdiction, the player, instead of being directed to an operator system 104, may be directed to a production environment (not shown) in the third party gaming system 102 where the player is only allowed to play the game in a demo mode (e.g. they will not be able to play for real money).

In some cases the player interface 208 may require that the player be authenticated before they are granted access to the player interface 208. In some cases, the player interface 208 may be configured to require the player to manually provide authentication information (e.g. a username and password) to login to the third party gaming system 102. Accordingly, the player interface 208 may be in communication with the data store 202 to access and update the player data (e.g. player account).

In other cases, the player interface 208 may be configured to receive authentication information from a trusted source. In these cases the third party gaming system player accounts may reference the player ID for the trusted source and it is this ID that is automatically provided to the player interface 208 and used for authentication. For example, the player may access the player interface 208 via a third party site, such as Facebook, Twitter or OpenID. The player would then give permission for their Facebook, Twitter or OpenID account information to be provided to the third party gaming system 102. When a player accesses the player interface 208 via one of these sites, their Facebook. Twitter or OpenID information is sent to the player interface 208 for authentication purposes.

In some cases the player interface 208 may be in the form of a web portal, however, it will be evident to a person of skill in the art that the player interface 208 may take any suitable form.

Each deployment service (e.g. deployment service 210) is configured to deploy and update gaming components from a reference/source environment to a target/destination environment. A deployment service (e.g. deployment service 210) can be configured to push new components or updates from the source to the destination, or pull new components or updates from the source to the destination. Each deployment service (e.g. deployment service 210) typically communicates with another deployment service in the other environment (source/destination). For example, the deployment service 210 in the gaming system 102 typically communicates with one or more deployment services in the operator systems 104.

The deployment service 210 in the gaming system 102 is responsible for deploying and updating game components from the gaming system 102 to the operator systems 104. Typically the deployment service 210 deploys and updates game components to a staging environment in the operator systems 104. The staging environment is typically used for quality assurance and integration testing. Once the new games and/or updates pass the quality assurance and integration testing then they are moved or deployed to a production environment. The configuration of an exemplary operator system 104 comprising a staging environment and a production environment will be described in further detail below in reference to FIG. 3.

In some cases, when a gaming operator has selected a new game and created a corresponding game instance via the operator interface 206, the operator interface 206 will notify the deployment service 210 of the new game instance. The deployment service 210 will then deploy the new game instance to the appropriate operator system 104. Deployment of the new game instance typically comprises taking a snapshot of the game data (as described above the game data excludes the game content) and packaging it as a game component. The game component is then transmitted to a corresponding deployment service in the operator system 104. When the operator deployment service receives the new component it executes a deployment script to install the new component.

As described above, the deployment service 210 may also be used to update components of the operator system 104. For example, the deployment service may be used to update the software running on one or more of the computers in the operator system 104. Such updates may be triggered by a system administrator via, for example, the management server 222, or by an operator via, for example, the operator interface 206.

The game content distribution service 212 is configured to store the game content and provide the appropriate game client to players upon request.

As described above in reference to the developer interface 204, once game content representing a test instance of a game is uploaded by a developer via the developer interface 204 and it has been approved, the game content is loaded onto the game content distribution service 212.

Once game content has been uploaded to the content distribution service 212 it forms part of a library of game content that can be accessed by an operator via the operator interface 206 to find and license new game content.

As described above in reference to the player interface 208, a player may use an end-user device, such as end-user device 106, to connect to the player interface 208. Once connected, the player can browse the library of gambling games offered by the gaming system 102. As described above, in some cases the player may be allowed to browse all of the gambling games loaded onto the game content distribution service 212. In other cases, the list of games available to the player may be filtered by one or more criteria. For example, the player may only be able to browse the games that have been licensed by at least one operator. In another example, the player may only be able to browse games that are offered in their jurisdiction or are offered by a particular operator.

If the user wishes to play one of the games in the library they select the desired game and a request for the selected game is sent to the game content distribution service 212. In some cases the end-user device 106 sends the request directly to the game content distribution service 212. For example, in the case of web-based gaming, the player interface 208 provides the end user device 106 with an HTML link to each game. When the user selects a game, the link is activated causing the end-user device 106 to send the request to the game content distribution service 212. In other cases, the end-user device sends the request to the player interface 208 and the player interface 208 sends the request to the game content distribution service 212.

Upon receiving the request the game content distribution service 212 retrieves the game content for the selected game and provides it to the end-user device 106 as a game client. In some cases the game content distribution service 212 may hold copies of all of the approved game content in internal or associated memory and thus retrieval of the game content comprises accessing the internal or associated memory to locate the appropriate game content. In other cases the game content is maintained in an external data store and thus retrieval of the game content comprises requesting or obtaining the appropriate game content from the external data store.

In some cases, the game content distribution service 212 is also configured to provide configuration data to the end-user device 106 to be used to configure the game client for a particular player and/or operator. The configuration data may include, but is not limited to, data allowing the game client to connect to the specific operator (e.g. a host name or IP address; and/or port number) and localized strings used to present messages to the player The specific configuration data may be based on, but is not limited to, which operator is hosting the game play, the jurisdiction of the player, the language of the player, and the currency used to play the game. In some cases at least a portion of the configuration data is obtained from an internationalization and localization service 214. An exemplary internationalization and localization service 214 will be described in more detail below.

The game content distribution service 212 may also be configured to provide game content to gaming operator quality assurance (QA) engineers. In these cases, a QA request may be distinguished from a player request based on a special parameter in the request. For example, QA requests may include a Test Key parameter that contains encoded server connection details. For example the Test Key parameter may be in the following format: SERVER_HOST_ADDRESS=xxxx&SERVER_PORT=yyyy where xxxx is either a host name or IP address of a game server and yyyy is the port that the game server is listening on. The Test Key may be encrypted using a private key provided to gaming operator for this purpose. In these cases the game content distribution service 212 will have access to the asymmetric public key for decryption purposes. The game content distribution service 212 may select the appropriate public key based on information provided in the request. For example, the game content distribution service 212 may select the appropriate key based on the operator identified in the request.

The internationalization and localization (i18n) service 214 provides localized configuration data to the game content distribution service 212 to allow the game client to be dynamically reconfigured for a specific jurisdiction, language and/or currency. Specifically, the internationalization and localization service stores several string tables for input display and user interface code for each game. For example, there may be an English (US) string table, an English (UK) string table, and a French string table.

In some cases, when the game content distribution service 212 receives a request for a particular game, the game content distribution service 212 sends a request to the internationalization and localization service 214 for the appropriate localized string table. The internationalization and localization service 214 then selects the appropriate localized string table and sends it to the game content distribution service 214. The internationalization and localization service 214 may select the appropriate localized string based on, for example, the specific game, jurisdiction of the player, language of the player, currency of the player and/or operator.

The client configuration service 216 is configured to generate and provide operator-specific configuration data for the game client to the end-user device 106. The operator-specific configuration data may include, but is not limited to: a list of modes of play available for the selected game in a particular jurisdiction; a list of operators that provide a particular mode of play in a particular jurisdiction; and operator configuration parameters for a particular operator.

For example, in some cases once a player has selected a game via the player interface 108, the player interface 108 sends a request to the game content distribution service 212 for the appropriate game client. In addition to generating the game client and providing it to the player, the game content distribution service 212 may be configured to query the client configuration service 216 for a list of modes of play available for the player's jurisdiction. The client configuration service 216 then returns the list of modes of play matching the query to the game content distribution service 212. The game content distribution service 212 then provides this information to the player via the end-user device 106 along with the game client.

Once a player has selected a mode of play via the game client, the end-user device 106, sends a request to the client configuration service 216 for a list of operators that support the selected game and the selected mode of play in the players jurisdiction. Upon receiving the request, the client configuration service 216 generates a list of operators that provide the selected mode of play for the selected game in the players jurisdiction. In some cases generating the list of operators comprises querying the data store 202 to determine the supported modes of play for the selected game in the players jurisdiction. Once the list is compiled the client configuration service 216 provides the list to the game client via the end-user device 106.

Once the player has selected an operator, the game client, via the end-user device 106, sends a request to the client configuration service 216 for a request to connect to the selected operator. Upon receiving the request, the client configuration service 216 obtains the appropriate operator configuration settings and then provides them to the game client via the end-user device 106. In some cases obtaining the operator configuration settings may comprise querying the data store 202 for the appropriate configuration settings. The operator configuration settings may include an IP address and port number for the operators system which is used by the game client to dynamically reconfigure itself to connect to the operator system 104 to initiate play of the game.

The data bank reader 218 is configured to obtain game transaction logs from the operator systems 104 for financial and analysis purposes. Specifically, the data bank reader 218 may periodically communicate with corresponding data bank services in the operator systems 104 to collect gaming transaction logs for transactions that have occurred since a specified period of time. Typically the specified period of time is the time of the last request. In some cases the transaction log request is made via a RESTful API (Application Programming Interface) over HTTPS (Hypertext Transfer Protocol Secure). The received data may be stored in a secure data store, such as data store 202.

The gaming system 102 may also comprise an additional business interface 220 that allows potential developers and operators to obtain information about the gaming system 102 and to register their interest in the gaming system 102.

The gaming system 102 may also comprise a management system 222 that allows management of the gaming system 102. Managing the game system may include one or more of the following: (a) managing game developer accounts including approving, changing, enabling/disabling the accounts and setting up and managing the financials; (b) managing gaming operator accounts including approving, changing, enabling/disabling account and setting up and managing financials; (c) generating reports on aspects of the gaming system 102 such as cash flow, submission, approvals etc.; (d) managing component releases; (e) managing support tickets from game developers and operators; and (f) managing the library of games.

Figure 3:
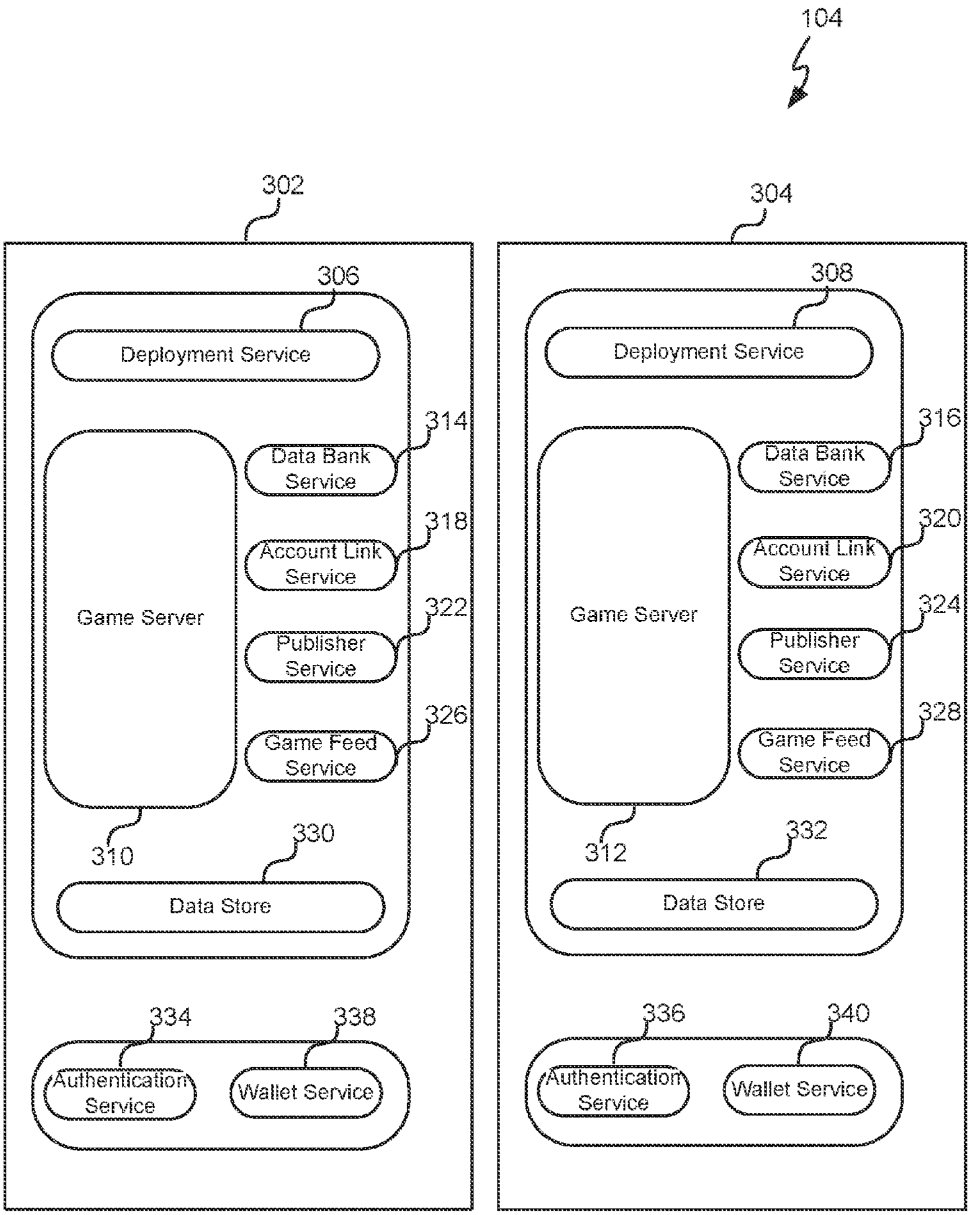
FIG. 3 is a block diagram of an exemplary operator system of FIG. 1.

Reference is now made to FIG. 3 which illustrates a block diagram of an exemplary operator system 104 of FIG. 1. The exemplary operator system 104 of FIG. 3 comprises a staging environment 302 and a production environment 304. The staging environment 302 is used for testing and quality assurance whereas the production environment 304 is used for hosting live gaming sessions. Generally, the gaming system 102 provides all the gaming components to the staging environment 302 and then once all the expected tests are completed within the staging environment 302, the gaming components in the production environment 304 are synchronized with the gaming components in the staging environment 302.

Although the exemplary operator system 104 of FIG. 3 comprises two environments (staging and production) in other embodiments the operator system may comprise more than two environments. For example, in some embodiments, the operator system may comprise a testing environment, an integration environment, a staging environment and a production environment. In these cases the game system 102 provides all the game components to the testing environment and once all the expected tests are completed within the testing environment the integration environment is synchronized with the testing environment. This process will then be repeated until the gaming components are synchronized in the production environment.

Each environment 302 and 304 comprises a deployment service 306 or 308, a game server 310 or 312, a data bank service 314 or 316, an account link service 318 or 320, a publisher service 322 or 324, a game feed service 326 or 328, a data store 330 or 332, an authentication service 334 or 336, and a wallet service 338 or 340.

Each deployment service 306 and 308 is configured to deploy and synchronize gaming components from a reference/source environment to a target/destination environment. In particular the deployment service 306 in the staging environment 302 is configured to receive and implement new and updated gaming components from the deployment service 210 in the gaming system 102. Similarly the deployment service 308 in the production environment 304 is configured to receive and implement new and updated gaming components from the deployment service 306 in the staging environment 302.

Whereas the deployment service 210 in the gaming system 102 is typically configured to push new and updated gaming components to the operator system 104, the deployment services 306 and 308 in the staging and production environments 302 and 304 are typically configured to pull new and updated game components from the downstream deployment service 210 or 306.

In some cases a publisher service 322 or 324 may be used to trigger synchronization of gaming components from one environment to the other. In these cases the publisher service 322 or 324 may send a request or command to the corresponding deployment service 306 and 308 to initiate synchronization from its downstream deployment service 210 or 306. The publisher service 322 and 324 will be described in more detail below.

Each game server 310 and 312 is configured to host gaming sessions from players using an end-user device 106. Since the game server 310 in the staging environment 302 is used for testing and quality assurance, the gaming sessions hosted by this game server 310 are typically established by test players.

In some cases each game server 310 or 312 accepts gaming connections from a game client running on an end-user device 106, facilitates authentication, and if the player is authenticated, allows play of the game. The game server 310 or 312 may allow a player to create a new game or continue an existing game.

Once the game server 310 or 312 receives a game request from a game client running on an end-user device 106, the game server 310 or 312 obtains authentication information that allows the player to be authenticated with the operator. In some cases, the authentication information is manually obtained from the player. For example, the player may be presented with an operator login screen where they are asked to manually enter a username and password for the operator.

In other cases, the authentication information may be provided transparently to the game server 310 or 312 by a trusted source. In these cases the operator player accounts may reference the player ID for the trusted source and it is this ID that is automatically provided to the game server 310 or 312 and used for authentication. For example, the player may access the system 100 via a third party site, such as Facebook, Twitter or OpenID. The player would then give permission for their Facebook, Twitter or OpenID account information to be provided to the operator system 104. Then when a player accesses the operator system 104 via one of these sites, their Facebook, Twitter or OpenID information is sent to the player game server 310 or 312 for authentication purposes.

In yet other cases, the third party gaming system 102 may be the trusted source. For example, the third party gaming system 102 may provide its own player account information to the game server 310 or 312.

Once the game server 310 or 312 receives the authentication information it provides it to the account link service 318 or 320. The account link service 318 or 320 transforms the account information into the appropriate format for the operators legacy authentication service 334 or 336. The authentication is then either accepted or denied by the authentication service 334 or 336.

If the player is successfully authenticated then the game server 310 or 312 starts a new game session for the player or allows the player to continue with an existing game session. When a new game session is started (e.g. a new hand of Blackjack is dealt) the game server 310 or 312 checks to see if the player has sufficient funds in their wallet for the bet made. Specifically, the game server 310 or 312 communicates with the operators wallet service 338 or 340 via the account link service 318 or 320. If the player has sufficient funds in their wallet a game round is created and the funds are moved from the players wallet to the game for purposes of funding the wager.

This action and any other actions taken during the course of the game round are recorded against the game round unless they require additional funds. If they require additional funds the game server 310 or 312 checks to see if the player has sufficient funds in their wallet for the additional wager. For example, since splitting a Blackjack hand requires a player to wager an additional amount of money in the game, before completing the split the game server 310 or 312 checks to see if the player has sufficient funds. If the player has sufficient funds in their wallet then a child game round is created. Therefore a child round represents the introduction of additional wagered funds into the game round. All decisions related to the additional wager will be stored in the game round details of the child game round.

At the end of the game round, the game server 310 or 312 resolves the outcome of the game sessions (player wins, loses or ties), awards any appropriate winnings to the players wallet, and closes the game round and any child game rounds. Awarding any appropriate winnings to the player typically comprises the game server 310 or 312 sending instructions to the wallet service 338 or 340 via the account link service 318 or 320.

Each data bank service 314 and 316 is configured to provide transaction data to the data bank reader 218 in the gaming system 102 upon receiving a request from the data bank reader 218. For example, the databank services 314 and 316 may periodically receive requests from the data bank reader 218 for all transactions that have occurred since the last request.

In some cases, upon receiving the request from the data bank reader 218, the databank service 314 or 316 queries the data store 330 or 332 for the transactions since the last request. The data store 330 or 332 then provides the relevant data to the data bank service 314 or 316 where it is then forwarded to the data bank reader 218. In some cases the data bank services 314 and 316 are configured to package the dataset of transactions in a JSON (JavaScript Object Notation) formatted groups of messages.

In other cases, the data bank service 314 or 316 is configured as a queue. The queue holds topic channels which contain all queued events until they are requested. In these cases, when the data bank service 314 or 316 receives a request from the data bank reader 218 it collects all of the data in the appropriate queue and provides it to the data bank service 314 or 316. In these cases, the data bank service 314 or 316 may only query the data store 330 or 332 when there is unexpected system failure in order to recover the queue.

Each data bank service 314 or 316 may also be configured to obtain environmental structure data from the computing devices in its environment. Environmental structure data typically describes the configuration of a computing environment and may include, but is not limited to which devices are masters, which are slaves, the IP Address and/or ports used by the devices, the operating systems and other applications running on each of the devices. In some cases the environmental structure data may be in the form of XML fragments. The received data may then be stored in a secure data store, such as data store 330 or 332.

The publisher service 324 may then use the environmental structure data to assess and highlight differences between the staging and production environments 302 and 304. In some cases the publisher service 324 may be able to obtain the environmental data for the production environment 304 via the deployment service 308. However, since the publisher 324 cannot communicate directly with the staging environment 302 it may be able to obtain the environmental data for the staging environment 302 via the deployment service 308 in the production environment 304 and the deployment service 306 in the staging environment 302. For example, the publisher service 324 in the production environment 304 may send a request to the deployment service 308 in the production environment 304 who in turns sends a request to the deployment service 306 in the staging environment 302. The deployment service 306 obtains the requested information and sends it back to the deployment service 308 who returns it to the publisher service 324.

The account link service 318 or 320 is configured to act as a translator between the game server 310 or 312 and the operators legacy authentication services 334 and 336 and wallet services 338 and 340. In some cases the account link service 318 or 320 may comprise an integration service for each legacy service (e.g. authentication service and wallet service) that allows the account link service 318 or 320 to translate authentication and financial transaction requests from the game server 310 and 312 to the appropriate format for the legacy service.

In some cases, when the account link service 318 or 320 receives an authentication request from the game server 310 or 312 the account link service 318 or 320 uses the appropriate integration service to translate the request into the appropriate format for the legacy authentication service 334 or 336 and transmits the translated request to the authentication service 334 or 336. The authentication service 334 or 336 responds with an indication of whether the authentication was successful or not. For example the authentication service 334 or 336 may provide one of the following responses: successful authentication, failed authentication, or timeout error. The account link service 318 or 320 then forwards the response to the game server 310 or 312 for processing.

In some cases, when the account link service 318 or 320 receives a financial transaction request from the game server 310 or 312 the account link service 318 or 320 uses the appropriate integration service to translate the request into the appropriate format for the legacy wallet service 338 or 340 and transmits the translated request to the wallet service 338 or 340. The response returned by the wallet service 338 or 340 will depend on the type of request. For example, where the financial transaction request is a request to remove funds from a players wallet (e.g. so that the player can make a wager) the wallet service 338 or 340 may respond, for example, with any one of the following responses: insufficient funds, or funds in the amount £X removed successfully where X is the value of the transaction. Where the financial transaction request is a request to add funds to a players wallet (e.g. because they have won a game) the wallet service 338 or 340 may respond, for example, with any one of the following responses: unable to complete transfer, transfer in the amount of £X completed successfully where X is the value of the transaction. Once a response is received it is forwarded to the game server 310 or 312 for processing.

The publisher service 322 or 324 is configured to allow the operator to control the operation of the staging and production environments 302 and 304.

In some cases the publisher service 322 or 324 may be configured to allow the operator to synchronize one or more gaming components of the current environment with the gaming components of another reference environment. Typically, only a publisher service 322 or 324 that resides in an environment that has a reference environment can perform synchronization. For example, the publisher service 324 in the production environment 304 may be used to synchronize the gaming components in the production environment 304 with the gaming components in the staging environment 302. However, since the staging environment 302 is the entry point and thus has no reference environment, the publisher service 322 may not be able to perform synchronization.

The publisher service 322 or 324 may be configured to allow synchronization of one or more of the following gaming components: a game, auxiliary service and the game server 310 or 312. The term "auxiliary service" is used to include any service in an environment 302 or 304 other than the game server 310 or 312 and includes, but is not limited to, the deployment service 303 or 308, the account link service 318 or 320, the publisher service 322 or 324, and the game feed service 326 or 328.

In some cases the publisher service 322 or 324 may use the corresponding deployment service 306 and 308 to complete the synchronization. For example, when an operator initiates synchronization of one or more gaming components in the production environment 304 with gaming components in the staging environment 302, the publisher service 324 may transmit a synchronization request to the deployment service 308. Upon receiving the request, the deployment service 308 pulls the identified gaming components from the deployment service 306 in the staging environment 302 and installs them in the production environment 304.

The publisher service 322 or 324 may also be configured to allow the operator to compare the configuration of a game between two environments prior to initiating synchronization. For example, the publisher service 324 may be configured to obtain meta data associated with the game's corresponding components in each environment to display configuration changes. The publisher service 324 may obtain the meta data for its own environment (the production environment 304) directly from the data store 332. However, since the publisher service 324 cannot directly access the data store 330 in another environment (e.g. the staging environment 302) meta data for the reference environment (the staging environment 302) may be obtained via the deployment service 308. For example, the publisher service 324 may transmit a request message to the deployment service 308 in the production environment 304 who in turn sends a request to the deployment service 306 in the staging environment 302. The deployment service 306 in the staging environment 302 obtains the requested information from the data store 330 in the staging environment 302 and provides it to the deployment service 308 who provides it to the publisher service 324.

The publisher service 322 or 324 may also be configured to allow the operator to enable or disable games in an environment. For example, the publisher service 322 or 324 may be configured to communicate with its game server 310 or 312 to enable or disable games.

The publisher service 322 or 324 may also be configured to allow the operator to enable or disable the corresponding game server 310 or 312 or the entire environment 302 or 304.

In some cases the publisher service 322 or 324 may be configured to require the user be authenticated before giving them the ability to make changes to the staging or production environment 302 or 304. For example, the publisher service 322 or 324 may require the user to provide a username and password.

The game feed service 326 or 328 is configured to generate a list of games that are currently offered in the environment. In some cases the game feed service 326 or 328 may generate the list of games by querying the corresponding game server 308 or 310 for a list of games that are currently installed and active on the game server 308 or 310. The operator may use the list generated by the game feed service 326 or 328 to provide their customers with an up to date list of games currently provided. In some cases the game feed service 326 or 328 may be implemented as a RESTful read-only interface.

The data store 330 or 332 is configured to store data used by the other components of the environment 302 or 304. For example, the data store 330 or 332 may be configured to store game data. Game data may include, but is not limited to, game rules and game configuration. Game data does not typically include game content which is stored by the game content distribution service 212 in the gaming system 102.

The data store 330 or 332 may also be configured to store environmental configuration data. As describe above environmental configuration data is data describing the structure of a computing environment including, but not limited to, IP addresses, port(s), operating system and applications (including version number) used and/or installed on each device in the environment.

The data store 330 or 332 may be in the form of a single database, a plurality of databases or any other suitable form that allows storing and accessing data.

Each authentication service 334 or 336 represents the operators legacy authentication system. The authentication service 334 typically has access to player account information which contains authentication information (e.g. username and password) which is used to authenticate a player. The authentication service 334 in the staging environment 302 is typically a mock authentication service 334 which only has access to test player accounts. Conversely, the authentication service 336 in the production environment 304 typically has access to the real player accounts.

Each wallet service 338 or 340 is the operators' legacy wallet or financial service which is used to track the amount of funds in the player accounts. The wallet service 338 in the staging environment 302 is typically a mock wallet service which only has access to mock financial data. Conversely, the wallet service 340 in the production environment 304 typically has access to and control over live financial data.

Figure 4:
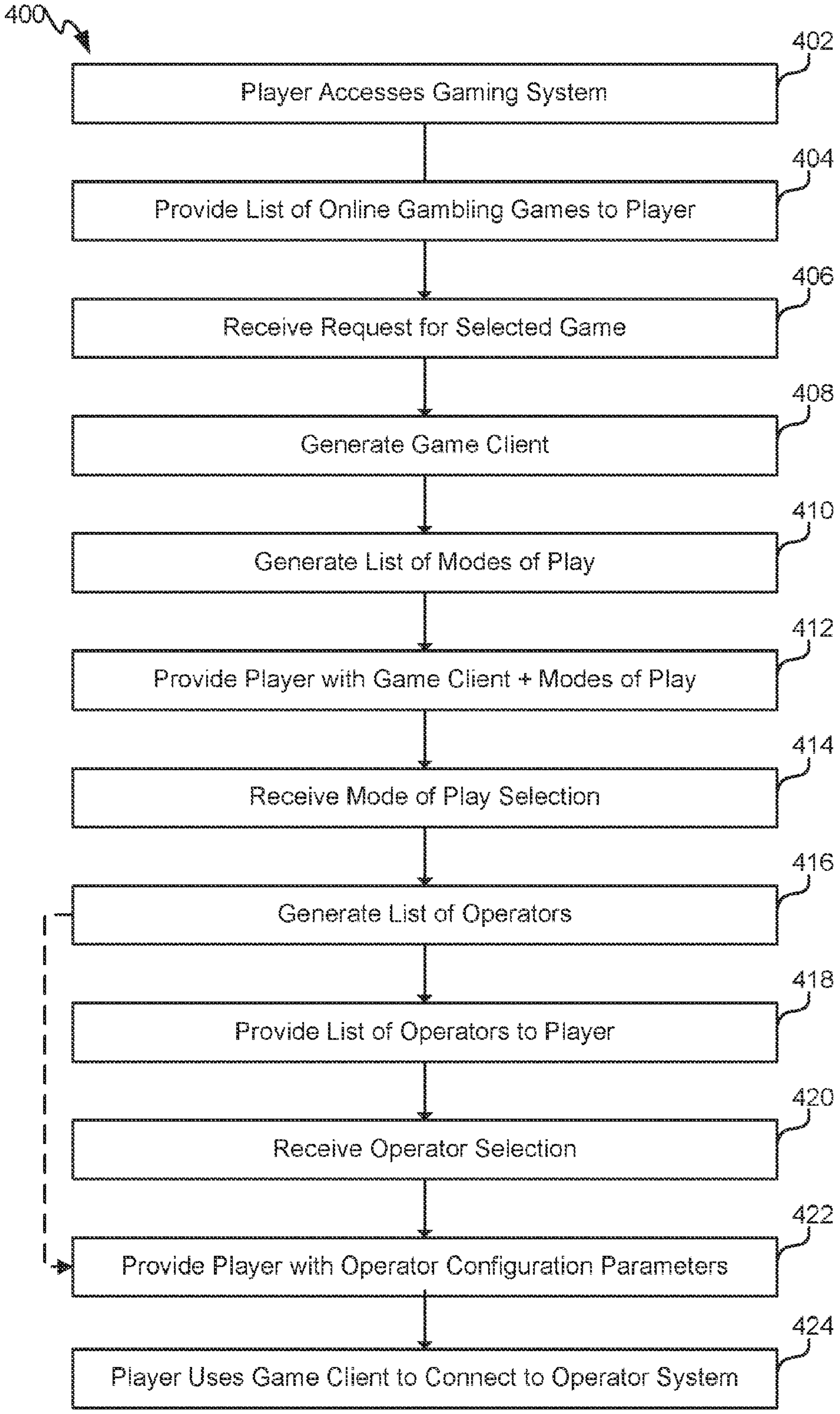
FIG. 4 is a flow chart of a method for providing a plurality of gambling games to players using the system of FIG. 1.

Reference is now made to FIG. 4 which illustrates a method 400 for providing gambling games to players using the system of FIGS. 1 and 2. At step 402 the player accesses the gaming system 102 via an end-user device 106. Typically the player accesses the gaming system 102 via a player interface, such as player interface 208. For example, where the player interface 208 is a web portal a player may use a web browser (e.g. Internet Explorer) installed on the end-user device 106 to access the player interface 208.

In some cases the player must be authenticated before they are granted access to the gaming system 102. For example, the player may be asked for a username and password. In other cases the player authentication information may be automatically provided by a trusted third party. In still other cases the system may allow a player or potential player to access the gaming system 102 without being authenticated. Once the user has gained access to the gaming system 102 the method 400 proceeds to step 404.

At step 404, the gaming system 102 provides the end-user device 106 with a list of one or more gambling games offered by a plurality of different gaming operators. The end-user device 106 then presents the list of gambling games to the player in a manner that allows the player to select one of the gambling games to play. Once the user has selected one of the gambling games to play, the end-user device 106 sends a request to the gaming system 102 to play one of the gambling games. Once the request has been sent, the method 400 proceeds to step 406.

At step 406, the gaming system 102 receives the request to play a selected gambling game from the end-user device 106. The request typically comprises, but is not limited to, information identifying the selected game. Once the request has been received, the method 400 proceeds to step 408.

At step 408, the gaming system 102 uses the data in the request and player attributes (if available) to generate a game client for the selected game. For example, the gaming system 102 may use the data in the request and the player attributes to generate a game client that has been customized or localized for a specific language, currency and/or jurisdiction.

The player attributes may include, but are not limited to, one or more of the following: jurisdiction, language and currency. It will be evident to a person of skill in the art that any other player attributes may be used instead of or in addition to the attributes listed.

In some cases at least a portion of the player attributes are obtained directly from the player. For example, when the player first accesses the gaming system 102, the player may be asked to provide certain information, such as their jurisdiction, currency, language etc. In other cases at least a portion of the player attributes may be obtained from another source. For example, the players jurisdiction may be automatically determined from the users IP address or via geolocation browser features. In cases where automatic detection is enabled, the user may have the option to override the automatic detection to correct an incorrect detection. Alternatively the players jurisdiction may be determined from the players account. For example, the players billing address may be used as the default jurisdiction.

In some cases at least some of the player attributes are obtained from both data obtained directly from the player and data obtained from another source. For example the players jurisdiction may be based on a combination of the automatically detected jurisdiction, the manually entered jurisdiction and the jurisdiction information in the players profile. A method for reconciling differences between these three modes of jurisdiction detection will be described in reference to FIG. 5.

Once the game client has been generated, the method 400 proceeds to step 410.

At step 410, the gaming system 102 uses the data in the request and the player data to generate a list of modes of play that are available to the player for the selected game. The modes of play may include, but are not limited to, demo play, virtual currency play and real money play.

The modes of play available for the selected game may be restricted based on the player attributes. For example, the modes of play available may be limited based on the jurisdiction of the player. Specifically, all modes of play may not be available in all jurisdictions. For example, some jurisdictions may not support real money play and therefore a player in these jurisdictions may be limited to demo play or virtual currency play. Similarly, there may be some jurisdictions that do not support real money play or virtual money play therefore a player in these jurisdictions may be limited to demo play. Once the list of modes of play is generated, the method 400 proceeds to step 412.

If there are no modes of play available for the selected game (e.g. if the player is not allowed to play this game for some reason (e.g. they don't meet the age requirements)) the gaming system 102 may generate an error message that is provided to the end-user device 106.

At step 412, the gaming system 102 provides the end-user device 106 with the game client and the list of one or more modes of play. The game client then presents the list of modes of play in a manner that allows the user to select one of the modes of play. At this point the user may also be given the option of changing or altering their jurisdiction information. Once a user has selected a mode of play the game client via the end-user device 106 sends the mode selection to the gaming system 102 and the method 400 proceeds to step 414.

At step 414, the gaming system 102 receives the mode selection from the game client via the end-user device 106. Once the mode selection is received, the method 400 proceeds to step 416.

At step 416, the gaming system 102 generates a list of one or more operators that offer the selected game and mode of play in the players jurisdiction. The list of operators may be further limited or filtered based on other player or operator attributes. For example, the gaming system 102 may be configured to filter or restrict the list of operators to operators that have at least X game(s) of type Y; to operators with a loyalty program; to operators with a bonus program; to operators that support the players currency; to operators that support the players language; and to operators that support a certain deposit method or any other suitable criteria. Once the list of operators has been generated, the method 400 proceeds to step 418.

If there are no operators that offer the selected game and mode of play in the player's jurisdiction the gaming system 102 may generate an error message which is provided to the game client via the end-user device 106. The game client then displays the error message to the player. After displaying the message game client may take the player back to the mode of play selection where they may select another mode of play.

At step 418, the gaming system 102 provides the list of one or more operators to the game client via the end-user device 106 where the list is presented to the player in a manner that allows the player to select an operator. Once the player has selected an operator, the game client, via the end-user device 106, sends the gaming system 102 data indicating the desired operator. Once the data is sent, the system 400 proceeds to step 420. In some cases, this step (step 418) and the next (step 420) are bypassed and the method 400 proceeds directly from step 416 to step 422. For example, when the list of operators generated in step 416 comprises only one operator, the method 400 may directly proceed from step 416 to step 422.

At step 420, the gaming system 102 receives the data indicating the desired operator. Once the request has been received, the method 400 proceeds to step 422.

At step 422, the gaming system 102 generates operator configuration parameters for the desired operator (or only operator). Once the gaming system 102 has generated the operator configuration parameters, the method 400 proceeds to step 422. In some cases the gaming system 102 may also generates or obtain an operator string table that comprises game strings specific to the operator.

At step 424, the gaming system 102 provides the operator configuration parameters and the operator string table (if available) to the game client via the end-user device 106. Once the game client has received the operator configuration information it dynamically reconfigures itself using the operator configuration parameters and the operator string table to communicate with the operator system 104 to play the game.

In some cases the player may not be given the ability to select the mode of play. For example, the gaming system 102 may be configured to automatically select a mode of play in certain cases. For example, the gaming system 102 may be configured to automatically select the mode of play if there is only one mode of play available to the user. The gaming system 102 may alternatively be configured to automatically select a mode of play using one or more other criteria. In these cases the gaming system 102 may generate the list of operators providing the selected game prior to providing the game client to the player. The game client and the list of operators may then be provided to the player together.

Reference is now made to FIG. 5, which illustrates a method 500 for determining the players jurisdiction when there is conflict between the various methods for determining the players jurisdiction. As described above, the players jurisdiction may be obtained using one of the following three methods: (1) the jurisdiction may be automatically detected using, for example, the players IP address or geolocation detection; (2) the jurisdiction may be manually entered by the player; and (3) the jurisdiction may be automatically retrieved from the players account information (e.g. billing address).

It is possible that all three methods will not produce the same jurisdiction. There are thus five possible permutations 502, 504, 506, 508 and 510 which may occur. In the first permutation 502 all of the methods produce the same results. In the second permutation 504 there is a single mismatch with the automatic detection and manual entry matching, but the account information does not match. In the third permutation 506 there is a single mismatch with the automatic detection and account information matching, but the manual entry does not match. In the fourth permutation 508 there is a single mismatch with the manual entry and account information matching, but the automatic detection does not mach. In the fifth and final permutation 510 each method produces a different result.

The gaming system 102 may apply a set of rules based on which permutation occurs. Ultimately this determines what game client (including internationalization and localization configuration & operator configuration) is provided to the player.

Generally, if the first permutation 502 occurs, the gaming system 102 will use the jurisdiction detected by the three methods.

In some cases, if any of second to fifth permutations 504, 506, 508 or 510 occurs, the gaming system 102 may be configured to ignore any automatic detections and manual entries and rely solely on the information in the players account (e.g. billing address).

In other cases, the gaming system 102 may only allow play if the automatic detection matches the player account information (e.g. billing address). For example, some jurisdictions may require that the automatically detected jurisdiction match the account information (e.g. billing address). In these cases only the first and second permutations 502 and 504 would allow play to continue. In all other cases, the player would be blocked from playing.

In still other cases, if the automatic detection does not match the player account information (e.g. billing address) the automatically detected jurisdiction will be used. For example, some jurisdictions may allow a mismatch between the automatic detection and the account information and may allow tailoring of the game client to support the rules governing play for the jurisdiction that the player is currently in.

It will be apparent to a person of skill in the art that domestic and foreign rules may go both ways. For example, an operator may specify that play is only permitted from certain countries. Similarly, a country may specify that play in their territory is permitted under certain circumstances regardless of an operators individual policies. The jurisdiction reconciliation rules can be adjusted accordingly to take account of the domestic and foreign rules that apply.

Figure 6:
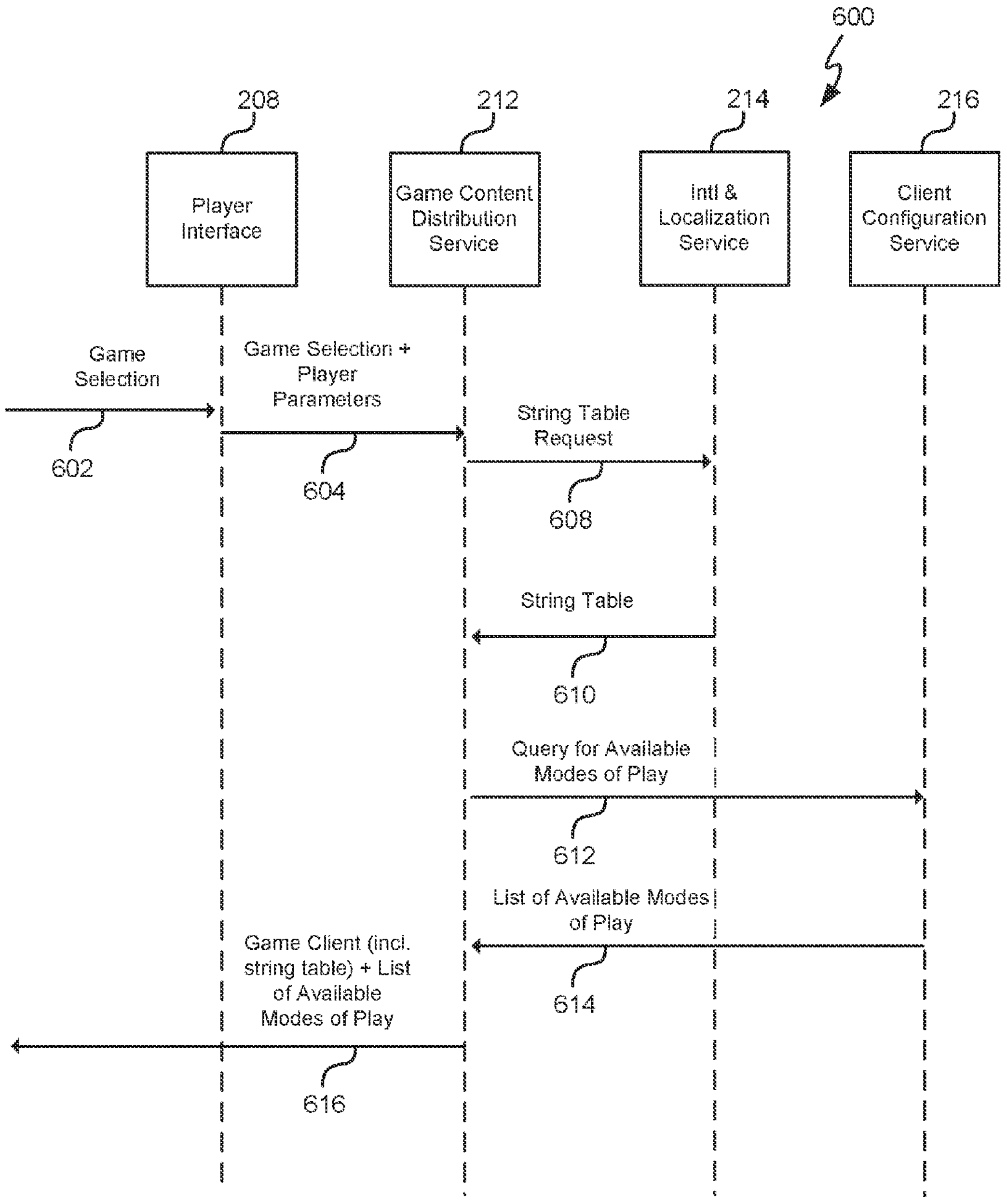
FIG. 6 is a message diagram illustrating the technical messages exchanged after the gaming system receives a request for a specific game.

Reference is now made to FIG. 6, which shows a message diagram illustrating the technical messages exchanged during steps 406 to 412 of method 400. At 602 the player interface 208 receives a request from an end-user device 106 to play a selected game. At 604, the player interface 208 sends the request (which identifies the selected game) along with one or more player attributes to the game content distribution service 212. The player attributes may include, but are not limited to, one or more of the following: the players jurisdiction, the players currency and the players language. At 606, the game content distribution service 212 sends a request to the internationalization and localization service 214 for the string table for the specified game for the players language, jurisdiction and/or currency (if this information was provided as part of the request from the player interface 208). At 608, the internationalization and localization service 214 provides the string table matching the request to the game content distribution service 212. At 610, the game content distribution service 212 sends a request to the client configuration service 216 for a list of modes of play for the selected game for the players jurisdiction. At 612, the client configuration service 216 provides a list of modes of play for the selected game in the players jurisdiction. At 614, the game content distribution service 212 generates a game client for the game and provides the game client, the string table and the list of available modes of play to the end-user device 106. The string table allows the game client to be dynamically configured for the players jurisdiction, currency and/or language. As described above, by only providing the player with the string table required for their jurisdiction, currency and/or language instead of all the possible string tables the amount of data sent to the end-user device 106 can be reduced.

Figure 7:
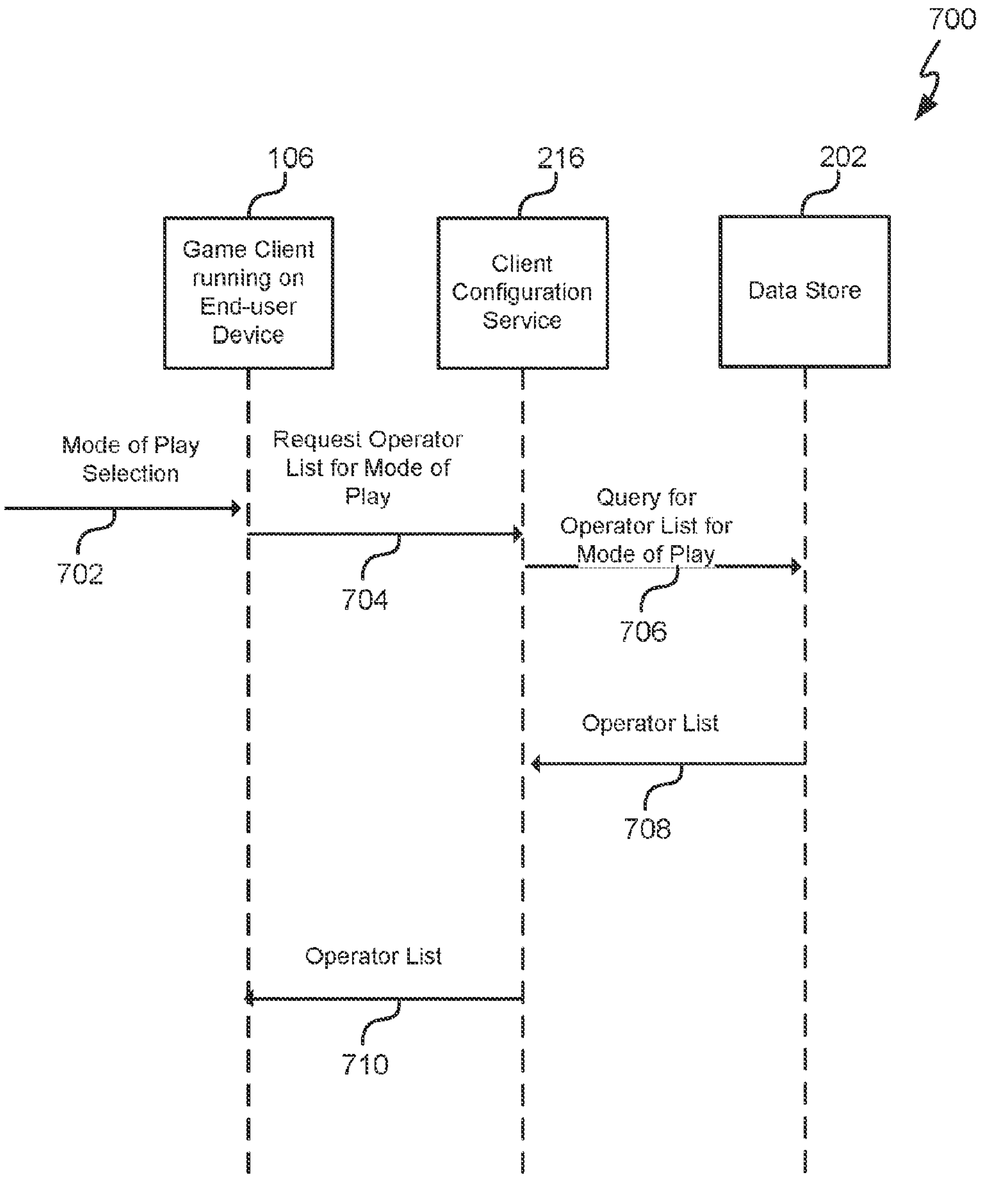
FIG. 7 is a message diagram illustrating the technical messages exchanged after the gaming system receives a request for a specific mode of play.

Reference is now made to FIG. 7, which shows the technical messages that may be exchanged during steps 414 to 418 of method 400. At 702 the game client running on the end-user device 106 receives a mode of play selection from the player. At 704, the game client via the end-user device sends the client configuration service 216 a request for operators supporting the selected game and selected mode of play in the players jurisdiction. In some cases the request may specify other parameters to further limit the list of operators. For example, the request may further specify that the list should only include operators offering a rewards program. At 706, the client configuration service 216 sends a query to the data store 202 for operators that offer the selected game and selected mode of play in the players jurisdiction (and that also meet any additional requirements specified). At 708 the data store 202 searches its data and generates a list of operators that meet the specified criteria. The data store 202 then provides the list of operators to the client configuration service 216. The client configuration service 216 then forwards the list of operators to the game client via the end-user device 106. Upon receipt of the operator list, the game client presents the list of operators to the player.

Figure 8:
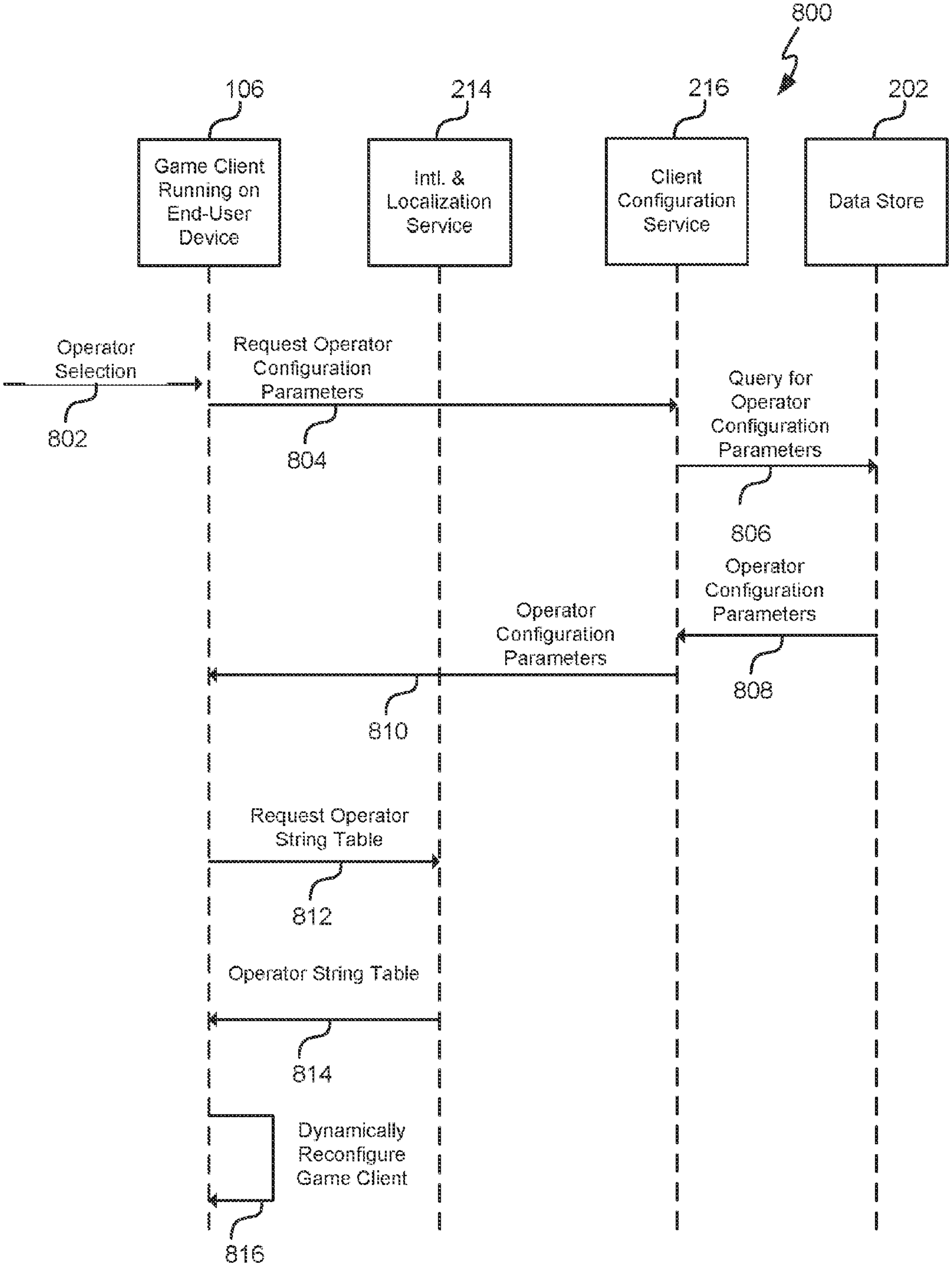
FIG. 8 is a message diagram illustrating the technical messages exchanged after the gaming system receives a request for a specific operator.

Reference is now made to FIG. 8, which shows the technical messages that may be exchanged during steps 420 and 422 of method 400. At 802, the game client running on the end-user device 106 receives an operator selection from the player. At 804, the game client via the end-user device 106 sends the client configuration service 216 a request for operator configuration parameters for the selected operator. As described above the operator configuration parameters allow the game client to be dynamically configured to communicate with the selected operator. The operator configuration parameters may include, but are not limited to, the IP address or host name of the operators production game server (i.e. game server 312) and the port number. At 806, the client configuration service 216 sends a query to the data store 202 for the operator configuration parameters for the selected operator. At step 808, the data store 202 sends the client configuration service 216 the operator configuration parameters for the selected operators. At 810, the client configuration service 216 sends the operator configuration parameters for the selected operator to the game client via the end-user device 106. At 812 the game client, via the end-user device 106, sends a request for the operator string table to the internalization and the localization service 214. At 814, the internalization and localization service 214 returns the requested operator string table. At 816, the game client dynamically reconfigures itself to use the operator configuration data and the operator string table. Once the game client is configured it connects to the operators system 104 to initiate play of the game.

Figure 9:
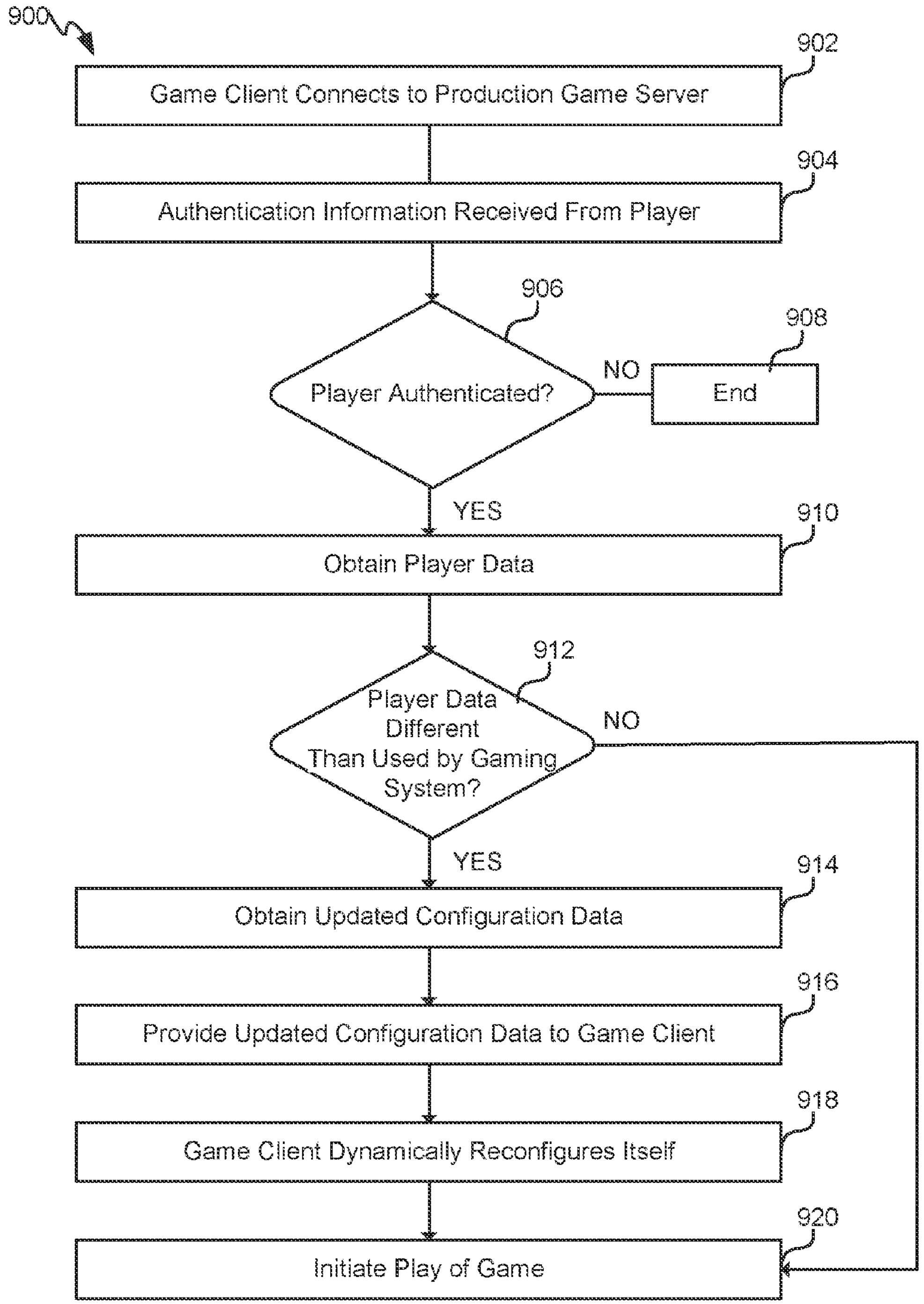
FIG. 9 is a method for initiating game play with an operator.

Reference is now made to FIG. 9 which illustrates a method 900 for playing a gambling game with a selected operator. At step 902, once the game client has received the operator configuration parameters for the selected operator and reconfigured itself using the operator configuration parameters it connects to the operator system 104 to initiate play of the gambling game. Typically the game client connects to the production game server 312.

At step 904, upon receiving a connection request from a game client, authentication information is obtained from the player. Where the player has an existing account with the operator, the player may be asked to provide their authentication information (e.g. username and password) associated with their account. Where the user has forgotten their username and/or password they may request that the username and/or password may be recovered. Where the player does not have an existing account with the operator, the player may be asked to create a new account. In other cases the authentication information may be automatically provided to the operator system 104 by a trusted source.

At step 906, the operator system 104 determines if the player has been authenticated. In some cases this involves the game server 312 sending the authentication information obtained in step 904 to the account link service 320 who translates the authentication information to an acceptable format for the authentication service 336. The account link service 320 then sends the formatted authentication information to the authentication service 336. The authentication service 336 then responds to the account link service 320 with information identifying whether the player is authenticated. The account link service 320 then forwards the information to the game server 312. If the player has not been authenticated then the method 900 ends at step 908. Conversely, if the player has been authenticated the method 900 then proceeds to step 910.

At step 910 the operator system 104 obtains player attributes from the players account. In some cases this involves the game server 312 querying the player data in the data store. The player attributes may comprise, but are not limited to, the players currency, the players billing address (including country of residence) an/or the players language. Once the player attributes have been obtained the method 900 proceeds to step 912.

At step 912 the operator system 104 determines whether the player data is different than the player data used by the gaming system 102 to configure the game client. If the player data is different than the player data then the method proceeds to step 914. If the player data is the same as the player data then the method 900 proceeds to step 920.

At step 914, updated game configuration data is obtained for the game client. In some cases the game server 312 may obtain the updated game configuration data from the data store 332. The game configuration data may comprise, but is not limited to, a localized string table. Once the updated game configuration data is obtained the method 900 proceeds to step 916, At step 916, the updated configuration data is provided to the game client. For example, the game server 312 may send the updated game configuration data to the game client via the end-use device 106. Once the game client has been sent, the method 900 proceeds to step 918.

At step 918, the game client dynamically reconfigures itself to use the new configuration data. Once the reconfiguration is complete, the method 900 proceeds to step 920.

At step 920, the player may initiate play of the game.

Figure 10:
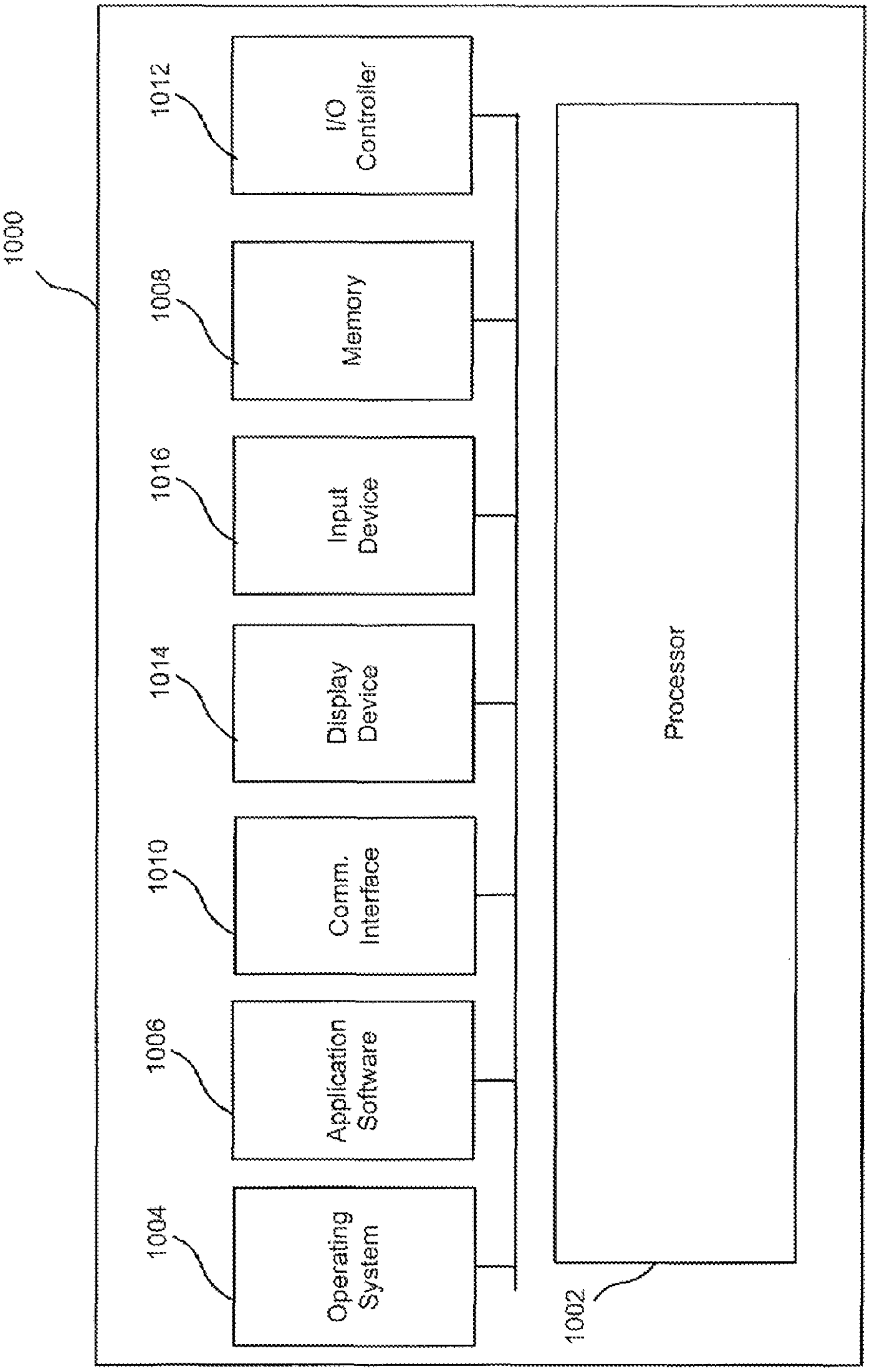
FIG. 10 is a block diagram of a computing-based device for implementing any of the methods described herein.

Reference is now made to FIG. 10 which illustrates various components of an exemplary computing-based device 1000 which may be implemented as any form of a computing and/or electronic device, and in which the methods described herein may be implemented.

Computing-based device 1000 comprises one or more processors 1002 which may be microprocessors, controllers or any other suitable type of processors for processing computer executable instructions to control the operation of the device to implement the method of FIG. 4 or FIG. 9. In some examples, for example where a system on a chip architecture is used, the processors 1002 may include one or more fixed function blocks (also referred to as accelerators) which implement a part of the method of FIG. 4 or 9 in hardware (rather than software or firmware). Platform software comprising an operating system 1004 or any other suitable platform software may be provided at the computing-based device to enable application software 1006 to be executed on the device.

The computer executable instructions may be provided using any computer-readable media that is accessible by computing based device 1000. Computer-readable media may include, for example, computer storage media such as memory 1008 and communications media. Computer storage media, such as memory 1008, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 1008) is shown within the computing-based device 1000 it will be appreciated that the storage may be distributed or located remotely and accessed via a network or other communication link (e.g. using communication interface 1010).

The computing-based device 1000 also comprises an input/output controller 1012 arranged to output display information to a display device 1014 which may be separate from or integral to the computing-based device 1000. The display information may provide a graphical user interface. The input/output controller 1012 is also arranged to receive and process input from one or more devices, such as a user input device 1014 (e.g. a mouse or a keyboard). In an embodiment the display device 1014 may also act as the user input device 1016 if it is a touch sensitive display device. The input/output controller 1012 may also output data to devices other than the display device, e.g. a locally connected printing device (not shown in FIG. 10.

The term 'processor' and 'computer' are used herein to refer to any device with processing capability such that it can execute instructions. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A system to provide a plurality of gambling games to a player, the system comprising:

a third party gaming system remotely located from a plurality of gaming operator systems, each gaming operator system from the plurality of gaming operator systems configured to act as a host of wagering activity for at least one of the gambling games, the third party gaming system configured to:

store a reconfigurable game client for each of the plurality of gambling games each reconfigurable game client enabling the player to play a gambling game from the plurality of gambling games with at least two gaming operator systems from the plurality of the gaming operator systems;

receive a request from an end-user device associated with the player to play a selected gambling game of the plurality of gambling games;

provide the reconfigurable game client for the selected gambling game to the end-user device;

generate a list of gaming operator systems from the plurality of gaming operator systems that are capable of acting as a host of wagering activity for the selected gambling game;

provide the list of gaming operator systems to the end-user device;

receive data from the end-user device indicating a selected gaming operator system from the list of gaming operator systems;

generate operator configuration parameters for the reconfigurable game client, the operator configuration parameters comprising connection information for the selected gaming operator system;

obtain an operator string table for the reconfigurable game client, the operator string table comprising game strings specific to the selected gaming operator system; and provide the operator configuration parameters and the operator string table to the end-user device such that the end-user device configures the reconfigurable game client to communicate with the selected operator system and to enable, using the game strings, the selected gambling game to be played on the end-user device on the selected gaming operator system.

2. The system according to claim 1, wherein the third party gaming system is further configured to filter the list of gaming operator systems based on at least one player attribute prior to providing the list of operators to the end-user device.

3. The system according to claim 2, wherein the at least one player attribute comprises at least one of player language and player currency.

4. The system according to claim 1, wherein the third party gaming system is further configured to:

generate a list of modes of play available for the selected gambling game;

provide the list of modes of play to the end-user device; and receive data from the end-user device indicating a desired mode from the list of modes; and filter the list of gaming operator systems to include only gaming operator systems that offer the selected game in the desired mode prior to providing the list of gaming operator systems to the end-user device.

5. The system according to claim 1, wherein the third party gaming system is further configured to filter the list of gaming operators systems to include only operators licensed to operate in the player's jurisdiction prior to providing the list of gaming operator systems to the end-user device.

6. The system according to claim 5, wherein the player's jurisdiction is based on at least one of the following: automatic detection, manual entry and player account information.

7. The system according to claim 6, wherein the third party gaming system is configured to reconcile differences between automatic detection, manual entry and player account information.

8. The system according to claim 1, wherein the third party gaming system is further configured to generate player configuration parameters for the reconfigurable game client prior to providing the reconfigurable game client to the end-user device, the player configuration parameters enabling the reconfigurable game client to be dynamically configured for the player.

9. The system according to claim 7, wherein the player configuration parameters being based on at least one player attribute, the at least one player attribute comprising at least one of player currency, player language and player jurisdiction.

10. A computer-implemented method to provide a plurality of gambling games to a player, the method comprising:

storing, at a third party gaming system, a reconfigurable game client for each of the plurality of gambling games, each reconfigurable game client configurable to enable the player to play a gambling game from the plurality of gambling games with at least two gaming operators from a plurality of gaming operators;

receiving, at the third party gaming system, a request from an end-user device associated with the player to play a selected gambling game of the plurality of gambling games;

providing the reconfigurable game client for the selected gambling game to the end-user device;

generating, at the third party gaming system, a list of gaming operators from the plurality of gaming operators that are capable of acting as a host of wagering activity for the selected gambling game;

providing the list of gaming operators to the end-user device;

receiving data, at the third party gaming system, from the end-user device indicating a selected gaming operator from the list of gaming operators;

generating, at the third party gaming system, operator configuration parameters, the operator configuration parameters comprising connection information for the selected gaming operator of the plurality of gaming operators;

obtaining, at the third party gaming system, an operator string table for the reconfigurable game client, the operator string table comprising game strings specific to the selected gaming operator; and providing the operator configuration parameters and the operator string table to the end-user device so that the end-user device configures the reconfigurable game client to communicate with the selected gaming operator and to enable, using the game strings, the selected gambling game to be played on the end-user device for the selected gaming operator.

11. The method according to claim 10, further comprising filtering the list of gaming operators based on at least one player attribute prior to providing the list of gaming operators to the end-user device.

12. The method according to claim 11, wherein the at least one player attribute comprises at least one of player language and player currency.

13. The method according to claim 10, further comprising:

generating, at the third party gaming system, a list of modes of play available for the selected game;

providing the list of modes of play to the end-user device;

receiving data, at the third party gaming system, from the end-user device indicating a desired mode from the list of modes; and filtering the list of gaming operators to include only those gaming operators that offer the selected gambling game in the desired mode prior to providing the list of gaming operators to the end-user device.

14. The method according to claim 10, further comprising filtering the list of gaming operators to include only those gaming operators that are licensed to operate in the player's jurisdiction.

15. The method according to claim 14, wherein the player's jurisdiction is obtained from least one of the following: automatic detection, manual entry and player account information.

16. The method according to claim 15, further comprising reconciling differences between automatic detection, manual entry and player account information.

17. The method according to claim 10, further comprising generating player configuration parameters for the reconfigurable game client prior to providing the reconfigurable game client to the end-user device, the player configuration parameters enabling the reconfigurable game client to be dynamically reconfigured for the player.

18. The method according to claim 17, wherein the player configuration parameters being based on at least one player attribute, the at least one player attribute comprising at least one of player currency, player language and player jurisdiction.

* * * * *